(12) United States Patent
Sragner

(10) Patent No.: US 6,272,485 B1
(45) Date of Patent: Aug. 7, 2001

(54) TRANSFERRING SELECTED FORMATTED DOCUMENTS OVER A COMPUTER NETWORK USING INTERFACE SCRIPT

(75) Inventor: Ruth Sragner, Brookville, MD (US)

(73) Assignee: Creative Internet Applications, Inc., Brookeville, MD (US)

(*) Notice: Subject to any disclaimer, the term of this patent is extended or adjusted under 35 U.S.C. 154(b) by 0 days.

(21) Appl. No.: 09/252,025

(22) Filed: Feb. 18, 1999

(51) Int. Cl.[7] .................................................. G06F 17/30
(52) U.S. Cl. ........................... 707/1; 707/10; 707/200; 707/523; 709/200; 709/219; 709/232
(58) Field of Search ...................... 707/1–10, 100–104, 707/200–206, 500–501, 512–516, 522–523, 900–901, 907–911; 709/200–203, 217–219, 229–232, 238, 249, 302–305; 713/200–202

(56) References Cited

U.S. PATENT DOCUMENTS

| | | | |
|---|---|---|---|
| 5,742,762 | * | 4/1998 | Scholl et al. ........................ 709/202 |
| 5,754,111 | * | 5/1998 | Garcia ................................ 340/573.1 |
| 5,771,289 | * | 6/1998 | Kuzma ................................... 380/23 |
| 5,781,739 | * | 7/1998 | Bach et al. ........................... 709/227 |
| 5,805,810 | * | 9/1998 | Maxwell .............................. 709/206 |
| 5,826,269 | * | 1/1999 | Hussey .................................. 707/10 |
| 5,857,191 | * | 1/1999 | Blackwell, Jr. et al. ............. 707/10 |
| 5,864,871 | * | 1/1999 | Kitain et al. ........................ 707/104 |
| 5,978,836 | * | 11/1999 | Ouchi ................................... 709/206 |
| 5,991,760 | * | 11/1999 | Gauvin et al. ........................ 707/10 |
| 6,092,114 | * | 7/2000 | Shaffer et al. ...................... 709/232 |

* cited by examiner

*Primary Examiner*—Jack Choules
*Assistant Examiner*—Srirama Channavajjala
(74) *Attorney, Agent, or Firm*—Young & Thompson

(57) ABSTRACT

A system and method for transmission of documents including word processing, spread sheets, and other formatted documents, over a computer network with no need for additional formatting software by using a CGI sending script to send e-mail with the selected document, in its native format, as an attachment to e-mail submissions or obtained directly from websites using standard word processing programs, with end user prerequisites for using the method and system being standard word processing software and e-mail capability; the form may returned to the server in electronic form, and the accompanying data posted to one or more databases, or automatically stored on disk, printed, or routed to other e-mail addresses.

20 Claims, 2 Drawing Sheets

TRANSFERRING SELECTED FORMATTED DOCUMENTS OVER A COMPUTER NETWORK USING INTERFACE SCRIPT

BACKGROUND OF THE PRESENT INVENTION

Generally, the present invention relates to the field of document transfer over a computer network. More specifically, the present invention relates to a system and method for the automated transmission of documents and data over a computer network, including the Internet, in order to simplify the user tasks of retrieving and working with documents and data relating to retrieved documents.

DESCRIPTION OF THE RELATED ART

The prior art has long recognized the potential of computer networks for transfer of documents between a central document store and remote document users. Further, the prior art has recognized the desirability of the remote document user being able to work with any received document. That is, the user being able to readily print the received document on the user's local printer, and to edit the received document or to input data into the received document.

A few examples of document and data transfer include an individual downloading tax forms at home from a central IRS site, completing the downloaded tax forms and returning the completed tax form to an IRS processing center; a software retailer's offering downloadable updates for software; and a corporate sales manager distributing informational announcements to a field sales force. Prior art methods to accomplish these document and data transfers, however, are complex and often fraught with a plurality of steps and software applications that frustrate users and deter users from the end goal of document and data transfer.

As a specific example, consider downloading IRS documents. The IRS Web site offers many documents (forms, instructions, etc.) for downloading. To retrieve an available document one must first select a file format (e.g. PDF, PCL, PostScript, and SMGL). Most Internet users are not aware that PCL and PostScript refer to printer control languages, nor do they generally know how to view or print these documents. PDF documents are a specialized file format supported by Adobe (trademark) and require the use of a piece of secondary software, Adobe Acrobat Reader (trademark) to view the document.

At the IRS Web site, after a user selects a file format and the particular document the user desires, a new Web page is presented. The page may advise the user that the desired document is available in several formats depending on printer type and paper size. The Web page also advises the user that after receiving the file, the user must decompress the file by typing the filename and pressing enter; that the file must be run under DOS; for systems other than DOS, that PKUNZIP can be used to decompress the file. Many users find these steps impossible.

Users who do determine and select the appropriate document file to download are presented with yet another window asking if the file should be downloaded. If downloading is desired, the user must specify a path to store the file locally. After the file is downloaded the user must locate the document at the previously specified path and decompress the file using appropriate software.

In addition to this process being overwhelming, the resulting document may be of limited use. If the PDF format is used, that file may not be editable. PCL or PostScript files may only be printable on the printer and paper size for which the document file was specifically designed.

Thus, prior art systems require users to download and install special document reader programs and decompression programs. These programs take up hard drive space and add a further level of complexity to the document transfer process. Documents transferred via FTP or bulletin board sites present similar difficulties.

Further, document users, as exemplified by Internet users, often have disparate needs and capabilities. The prior art, while attempting to address the broad range of user needs and skills, has resulted in a variety of generally complex systems and methods to accommodate document transfer. This variety in sum results in computer network users being presented with expensive, complex, and difficult-to-learn alternatives. The absence of a flexible, easy-to-operate document transfer system often results in users simply abandoning the document transfer effort.

OBJECTS OF THE INVENTION

An object of the present invention is to overcome some of the disadvantages of the prior art systems by providing for automated transmission of documents and data over the Internet and over Intranets.

It is a further object of the present invention to provide a novel method of providing a remote user access to forms and other formatted or graphic documents across all major computing platforms without the need for secondary formatting software.

It is yet a further object of the present invention to provide a novel method of transferring selected formatted documents over a computer network.

It is still a further object of the present invention to provide a novel document transfer system utilizing a central service providing access to plural documents from remote user stations which allows a user to locate, retrieve and print fully formatted documents in user-designated formats.

It is another object of the present invention to provide a novel, non-technical system adapted to access formatted documents over a computer network which obviates the need to use specialized formats such as Adobe Acrobat Reader.

It is yet a further object of the present invention to provide a document transfer system having an operating capability within an Internet browser to permit selection and retrieval of documents without the need to install a browser plug-in, helper applications, decompression programs, and to obviate the requirement for a user to specify a document save location through a 'save' window.

It is yet another object of the present invention to provide a novel method of transferring documents and related data between a central server and one or more remote users.

It is a still further object of the present invention to provide a novel method and system of providing for government agencies and other services or goods purchasers, procurement electronically over computer networks and to eliminate much of the required paper-form procurement documents of the prior art procurement methods.

These and other objects and advantages of the present invention will be apparent to those of skill in the art from a perusal hereof.

SUMMARY OF THE INVENTION

The present invention offers a user-friendly system that sends user-selected documents, which may also include related data, from a central server to a remote user automatically over a computer network utilizing a server gateway interface script to directly attach the selected document and any related data to an e-mail message directed to a designated e-mail address. The invention also provides for the return of documents and information from the user to the central server.

The documents may be of any format, including forms, instructional materials, newsletters, and databases. The server gateway interface may be the Common Gateway Interface ("CGI"). The related data may include user-personal information, form-specific data, and user preferences.

The invention includes a central server upon which the server gateway interface script and the available documents and data reside.

The documents are made available in plural formats, which may include but are not limited to Microsoft Word (trademark), Corel WordPerfect (trademark), Lotus 123 (trademark), Microsoft Excel (trademark), and ASCII Text.

An computer network document transfer system of the present invention includes a CGI sending script which instructs a network server to send an e-mail to a user e-mail address and to attach to the e-mail a user-selected document in a user-selected document format.

The present invention also includes a provision for a security screen to maintain, manage, rename, update and remove the available documents.

The various embodiments of the present invention include both methods and systems which provide user-friendly methods and systems that send user-selected documents, optionally including related data and data entry points, from a central server to a remote user automatically over a computer network. These embodiments include host sites such as the IRS and other government agencies as well as private corporate hosts providing selectable documents and services from a central server such as tax forms, application forms such grant applications, business and tax forms and reporting forms, and publications such as government reports, books, and instructions.

In these embodiments, users log onto a web-site, select and download a document file. The downloaded document file may be saved, data entered in data fields of the documents, printed, and e-mailed back or conventionally returned, e.g., faxed or mailed back to the document sender.

By using the invention on a secure server, digital commerce such as procurement and consumer purchasing is advanced.

Further, the invention is suitable both for automatic e-mailing of selected documents to individual users and groups of users alike. The invention provides for mailing in a broadcast e-mail mode wherein selectable e-mail lists determine who, and in what format, documents such as printable magazines or forms are sent. Such electronic mail broadcasting saves both sender costs but further environmental policies but avoiding the use of paper mail.

DESCRIPTION OF PREFERRED EMBODIMENTS

Figure 1:
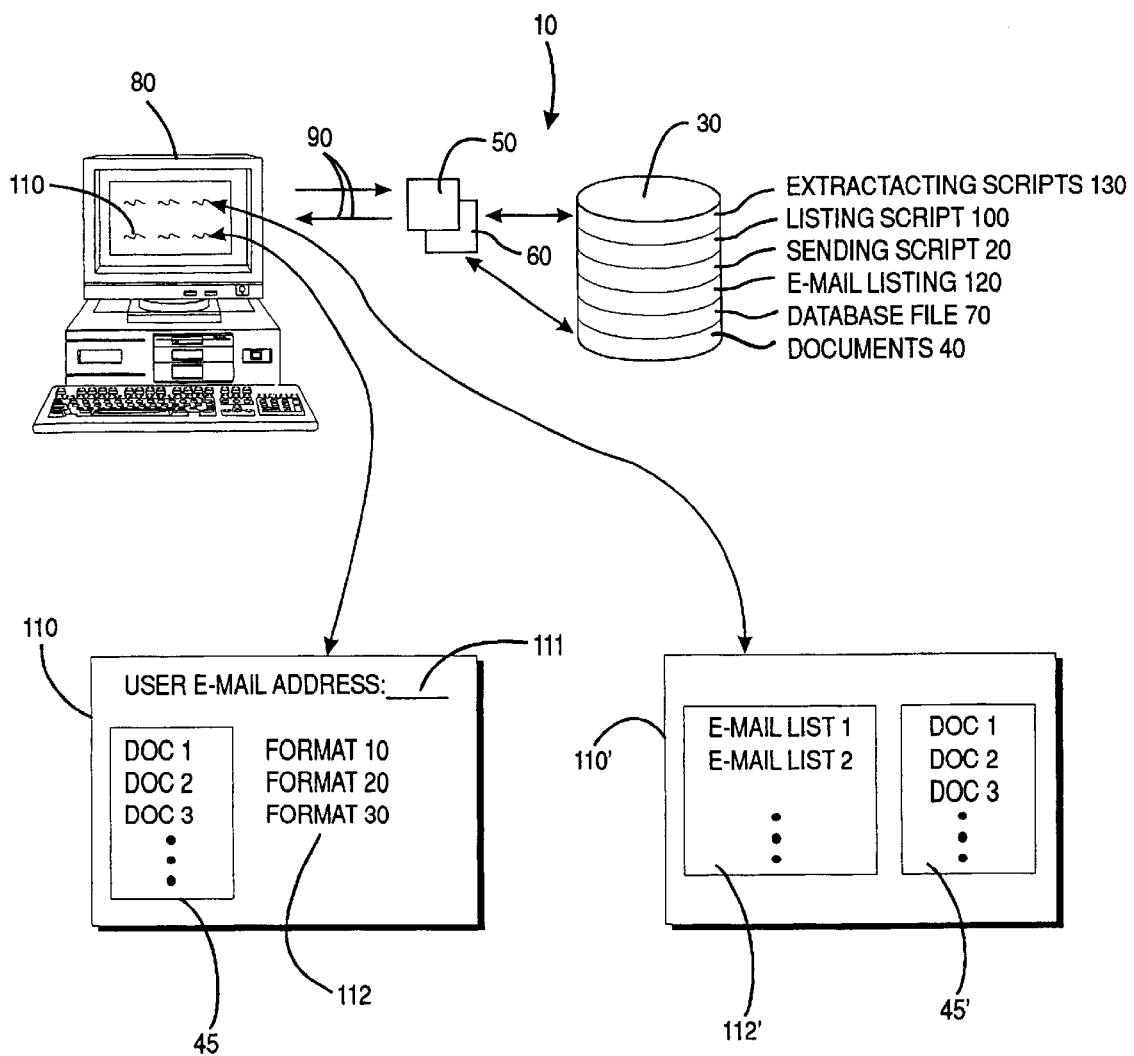
FIG. 1 is a view of an embodiment of the document transfer system of the present invention.

With reference to FIG. 1, an embodiment of the present invention is a computer network document transfer system 10 which includes a CGI sending script 20 residing on a network server 30 together with documents (or document files) 40. The CGI sending script 20 instructs the network server 30 to send an e-mail 50 and to attach to the e-mail a selected document 60 in a selected document format from the documents 40 residing on the server 30.

The CGI sending script 20 is an e-mail generating tool that avoids any need to pass information to an e-mail application or to invoke an e-mail application. The CGI sending script 20 accepts a destination e-mail address, a desired document 60, and a desired document format and then generates and sends, via network server 30, the generated e-mail 50 to the user e-mail address together with the desired document 60 as an e-mail attachment. The CGI sending script inputs may be taken from a database file 70 or solicited from a user. When inputs are solicited from a user, the CGI sending script interprets the user responses and attaches the selected document in the selected format to an outgoing e-mail sent to the user's e-mail address.

The CGI scripts and the documents both normally reside in the CGI bin of the server. However, either or both the CGI scripts and the documents may reside outside the CGI bin.

An embodiment of the present invention may operate in either an Internet or Intranet environment. In each network, a user selects and retrieves a desired document 60 in a desired format from the network server 30.

In such an embodiment the user may be at a user terminal 80 that is connected to the network server 30 via the Internet (depicted by two-way lines 90) or an Intranet (also depicted by two-way lines 90). The user selects documents by first accessing the appropriate document server Web page, e.g., www.docs-r-us.com, which triggers a listing process script 100 of this invention.

The listing process script 100 of this invention determines the document files 45 available and provides the user with a list of available document files 45 and a list of available formats 112 for available document files 45. For the purpose of interacting with a Web browser and network server, the listing process 100 of the invention is written as a CGI script.

The listing process script 100 solicits input from the user by a request form 110. The request form 110 includes input region for the user e-mail address 111, allows the user to select a particular document 60, e.g., doc 3 from list of available document files 45, and also allows the user to select a document format 112, e.g., format 3. The user responses to the request form 110 are submitted via network server 30 to the CGI sending script 20.

In a system embodiment, the network server 30 hosts plural documents 40. The CGI listing script 100 first provides a user at a user terminal 80 a list of available documents 45 from the plural documents 40 residing on the network server 30. Additionally, for the available documents 40, the CGI listing script 100 also provides the user a list of available document formats 112. The CGI listing script 100 further solicits from the user the user e-mail address 111, a document-select input indicating the selected document 60 to be transferred from the list of available documents 45, and a selected document-format input indicating the selected document format from the list of available document formats 112.

The CGI sending script 20 instructs the network server 30 to send the e-mail 50 to the user e-mail address 111 and to attach to the e-mail 50 the selected document 60 indicated by the document-select input in the selected format 112 indicated by the document-format input.

In the above embodiments, the network server 30 may be part of an Intranet, the Internet, or both an Intranet and the Internet.

Figure 2:
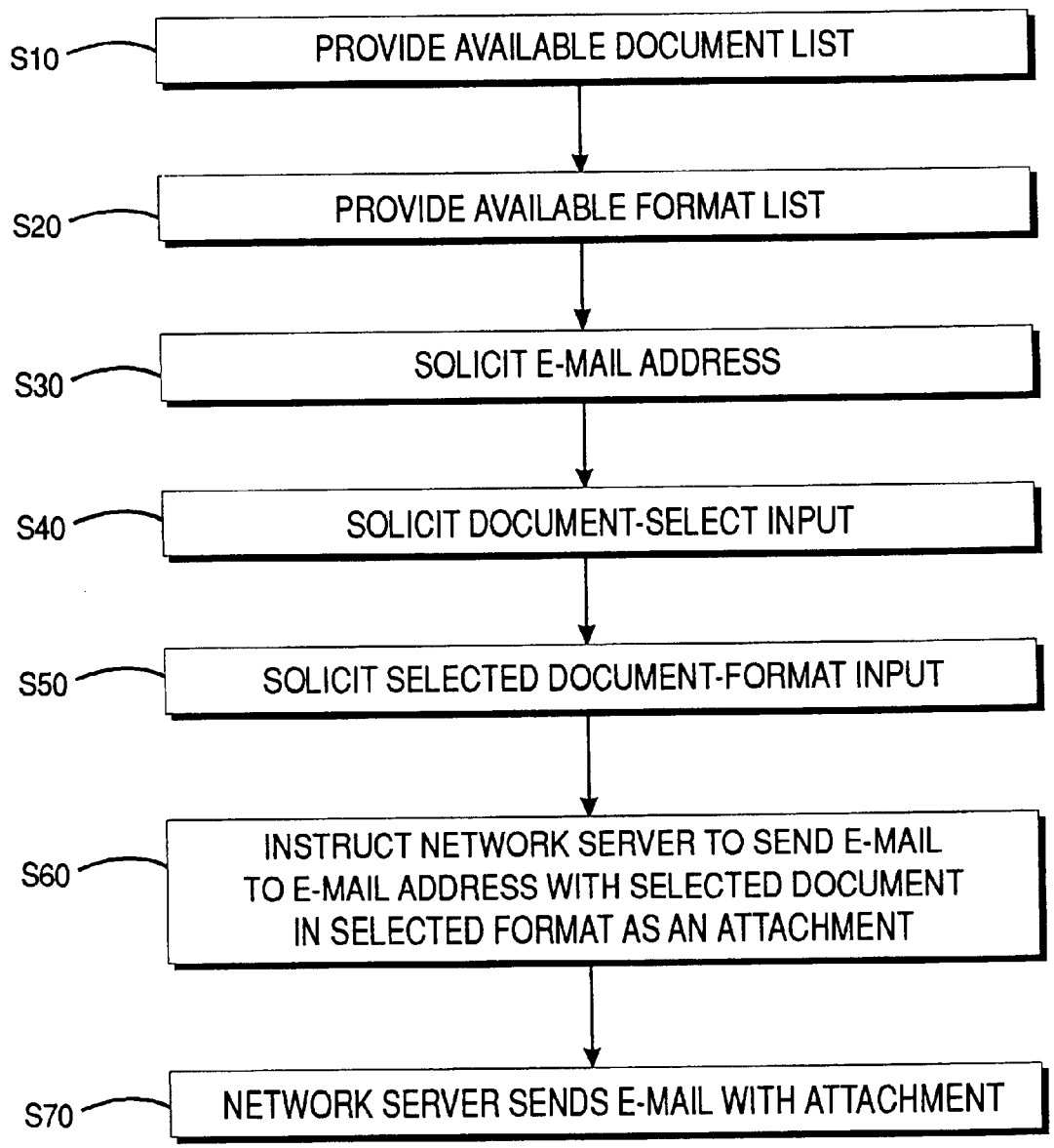
FIG. 2 is a flow chart of a method of the present invention.

With reference to FIGS. 1 and 2, the present invention includes a method of transferring documents on a computer network. The invention provides a CGI sending script 20 residing on a network server 30 sending instructions to the network server 30 to send an e-mail 50 to a user e-mail address 111 and to attach to the e-mail 50 a selected document 60 in a selected document format.

The invention allows a network user (including an Internet or an Intranet user) to user-select and download a desired document 60 from a remote network server 30.

In an embodiment of the method of the invention, the CGI sending script 20 and a CGI listing script 100 reside on network server 30 together with documents 40.

The method utilizes the CGI listing script 100 to provide a user at a user terminal 80 a list of available documents 45 from the documents 40 residing on the network server 30 (step 10). Further the CGI listing script provides a list of available document formats 112 (step 20).

The CGI listing script 100 also solicits from the user the user e-mail address 111 (step 30), a document-select input indicating the selected document to be transferred from the list of available documents (step 40), and a selected document-format input indicating the selected document format from the list of available document formats (step 50). Note that steps 10–50 need not be performed in the listed order but may be performed in any suitable order.

Utilizing the input from steps 30–50, the CGI sending script 20 instructs the network server to send an e-mail 50 to the user e-mail address 111 and to attach to the e-mail 50 the selected document 60 indicated by the document-select input of step 40 in the selected format indicated by the document-format input of step 50 (step 60).

Upon receipt of the CGI sending script instructions, the network server 30 sends the e-mail 50 with attached selected document 60 (step 70).

In the method and system of the invention, a user at a user terminal 80 logs onto a network, e.g., the Internet, and onto the appropriate document server web page, e.g., www.docs-r-us.com which calls the CGI listing script 100 on network server 30.

The CGI listing script 100 need not communicate with other application programs that are running on the server as the CGI listing script 100 itself determines the available documents 45 and the available document formats 112 and instructs the network server 30 to communicate this information to the user at user terminal 80 through request form 110.

Again, without the aid of any other application programs, the CGI listing script 100, via request form 110, solicits input from the user. Request form 110 inputs are submitted via the network server 30 to the CGI listing script 100.

In turn, the CGI listing script 100 communicates with the CGI sending script 20 also located on the network server The CGI sending script directs the network server 30 to send an e-mail 50 to the user at the user's e-mail address 111 and to attach the selected document 60 in the selected format. Responsively, the network server 30 sends an e-mail 50 with attached thereto the selected document 60 in the format selected from format list 112 attached thereto to the user at the e-mail address provided by the user.

Advantageously, selected document 60 arrives on user terminal 80 in an format selected by the user and for which the user has appropriate software. As the selected document 60 is in a format selected by the user, the user can edit and print the selected document 60 with normally used software resident on the user's terminal (computer). Software formats may include available word processors, spreadsheets, databases, and others.

Advantageously, use of the CGI does not restrict programming languages in which the CGI scripts can be written. Any language which receives data from the network server 30 and sends data or instructions back to the network server 30 can be used for executing the CGI script.

On a UNIX platform, Perl is one preferred language for writing the CGI scripts. C, C++, Tcl, and Python are also preferred for UNIX servers. On Macintosh servers, Applescript, C, and C++ are preferred. On Windows servers, Visual Basic, Perl, C, and C++ are preferred.

Request input form 110 may include the use of an appropriate conventional input means such as a "Browse" button, check boxes, radio buttons, and scroll boxes as input means.

In an alternative embodiment, the user is not required to provide all required inputs. For example, browser cookies may be used to provide a user e-mail address 111.

In embodiments of the invention utilizing cookies to pass user-side information may optionally include information concerning document file formats 112 of interest to the user. For example, a particular user may use both Microsoft Word version 7 and WordPerfect version 5.1 for DOS available, as well as Microsoft Excel.

The CGI listing script 100 solicits the user's cookies and thereby knows that Microsoft Word version 7 and WordPerfect version 5.1 for DOS as well as Microsoft Excel are possible document formats for this user. Responsively, these document formats may be shown on request input form 110 as the first two document formats of format list 112, or, alternatively, as the only two document formats listed in format list 112.

In yet another embodiment of the invention, browser cookies store persistent data such as user e-mail address 111 and user preferred document formats so that the user is not prompted for this information. For example, a user who has used the system before has provided an e-mail address 111 (user@www.com) and selected MS Word 7 as a preferred format. This information is stored in the user's browser cookies and is retrieved by the listing script 100 when the request input form 110 is displayed. In this embodiment, the user simply selects the desired file as the CGI listing script 100 has retrieved the other required information from the browser cookies.

In addition to the present invention providing means for a user to select and transfer a single e-mail document from a network server, the present invention provides that a user may select a list of e-mail recipients to receive a document. In this embodiment, the CGI sending script 100 instructs the network server 30 to send an e-mail 50 to each of a plurality of user e-mail addresses 111 and to attach to each of the e-mails 50 a selected document 60 in a selected document format. The e-mail addresses 111 are available in e-mail lists 120 residing on the network server 30.

This embodiment includes a CGI listing script 100 which solicits from the user a desired e-mail listing 112' which includes the e-mail addresses and selected document format for each e-mail addressee. The CGI listing script 100 displays request form 110' which includes available document files 45' and available e-mail lists 112'. The various available e-mail lists 112' are selected from e-mails lists 120 residing on the network server 30.

As an example use of this embodiment, a headquarters manager can broadcast mail a copy of a new product description (document 2 which is available in a variety of formats) to each of the field sales representatives listed in e-mail listing 3 by selecting these from form request window 110'.

In this example, the manager at a user terminal 80 logs onto a network, e.g., a company Intranet, and onto the appropriate document server web page, e.g., www.co-docs.com which calls the CGI listing script 100 on network server 30.

As with the other embodiments, the CGI listing script 100 need not communicate with other application programs that are running on the server as the CGI listing script 100 determines the available documents 45' and the available e-mail lists 112' and instructs the network server 30 to communicate this information to the manager at user terminal 80 through request form 110'.

Again, without the aid of any other application program, the CGI listing script 100, via request form 110', solicits input from the manager. In this embodiment, request form 110' inputs include the selected document 60 to be sent to each field representative listed in the selected one of the e-mail lists 112'. The inputs are submitted via the network server 30 to the CGI listing script 100.

The CGI listing script 100 communicates with the CGI sending script 20 also located on the network server 30. In some embodiments the CGI listing script 100 and the CGI sending script 20 comprise a single script.

The e-mail list comprises records each with an e-mail address entry and a selected format entry. Thus, the selected formats for each e-mail addressee need not be entered with each broadcast mailing.

The CGI sending script 20 reads each record entry of the selected e-mail list and directs the network server 30 to send an e-mail 50 to entry's e-mail address 111 and to attach the selected document 60 in the entry's selected format. Thus, the network server 30 sends an e-mail 50 with attached thereto the selected document 60 in the format taken from format list 112' attached thereto to each addressee of the selected mailing list.

With reference to FIGS. 1 and 2, in another embodiment of the present invention, data relating to a selected document may concurrently be sent to the user's e-mail address 111 with a selected document 60. An insurance company agent sending a form to a client's e-mail address with data relating to a particular client included in the e-mail, would be an exemplary use of this embodiment.

In this embodiment, the network server 30 also hosts plural documents 40 and a database file 70 related to the plural documents 40. The CGI listing script 100 provides the agent a list of available documents 45 from the plural documents 40 residing on the network server 30 (step 10). The CGI listing script 100 also provides the agent a list of available document formats 112 (step 20).

The CGI listing script 100 solicits from the agent an e-mail address for the client (step 30). By way of a document-select input, the agent indicates the selected document 60 to be transferred from the list of available documents 45 to the client (step 40). The agent also selects, via a selected document-format input, the selected document format from the list of available document formats 112 (step 50).

The CGI sending script 20 reads data from the database file 70 relating the selected document 60. This data may also relate to the e-mail address 111. In this way the e-mail to be sent will include both information appropriate for the form (document) being sent as well as information specific to the client associated with the provided e-mail address 111.

The CGI sending script 20 instructs the network server 30 to send the e-mail 50 to the client e-mail address 111, to attach to the e-mail the selected document 60 indicated by the document-select input in the selected format indicated by the document-format input, and to include in the e-mail the data obtained from the database (step 60).

The agent's client will receive the form via the Internet. The client then can read and edit the form with software on the client's computer. The data from the database may be merged into the selected document either by the CGI sending script 20 or by the client with software resident on the client's computer.

Once the client completes editing the received form, for example, by inserting data into data fields, the client can return the form to the network server 30.

Network server 30 includes a CGI data extracting script 130. The extracting script 130 reads the data entered into the data fields. The extracting script 130 then acts upon the data read from the data fields. The extracting script 130 may update database file 70 with the extracted data by opening and amending the database file. Advantageously, the extracting script 130 extracts the data and updates the database file 70 without the use of any non-CGI application program.

Features of each of the embodiments may be used together. For example, the insurance agent may want to send the same form to each of his clients. In this embodiment, the insurance agent accesses request form 110' displaying various e-mail lists 112' and document list 45'.

The insurance agent selects the form (document) to be sent from document list 45'. The insurance agent also selects the desired e-mail list which comprises records of his clients, their preferred document formats, and his clients' e-mail addresses. The sending scrip 100 reads the selected e-mail list to determine the e-mail address 111 for each e-mail, the preferred document format for that e-mail address, and, optionally, the client name associated with that e-mail address.

If data is associated with the selected form, the sending script 100 uses the client name (or another appropriate field value such as the e-mail address) to access a database file 70 which includes data relating to the selected form.

The sending scrip 100 then directs the network server 30 to send an e-mail to each client using the e-mail list for each e-mail address 111 and preferred document format, and using the database file 70 to obtain related data specific to that client.

In a procurement embodiment of the invention, both request forms 110 and 110' are utilized. The invention advantageously provides to the requirement of selectively distributing the various procurement process announcement and bid documents.

Whether private or governmental, procurement involve numerous instructional and informational documents as well as application form and bidding documents. Some documents go to but a single addressee, while other documents are distributed to many addressees. For example, request form 110 is utilized when sending a document to an individual addresses, such as sending to the apparent low bidder of a procurement solicitation a list of further requirements for the bidder to be awarded the contract. Similarly, request form 110' is utilized when sending a bid package to a list of bidders displayed in e-mail lists 112'.

In such a computerized method of procurement, the invention provides a network server 30 connected Internet and hosting the various procurement documents. The network server also hosts a CGI sending script 20 designed and adapted to send instructions to the network server to send an e-mail 50 to a user e-mail address 111 and to attach to the e-mail a selected procurement document 60 in a selected document format.

The procurement method also provides a CGI listing script 100 on the network server to provide a user, such as a contracting officer working at an Internet-connected computer, a list of available procurement documents 45. The contracting officer provides via request form 110, a user e-mail address (the low bidder's e-mail address), a document-select input indicating the selected procurement document to be transferred from the list of available procurement documents to the low bidder, and a selected document-format input indicating a procurement document format from the list of available procurement document formats appropriate for that bidder.

The CGI sending script instructs the network server to send the e-mail 50 to the user (low bidder) e-mail address 111 and to attach to the e-mail the selected procurement document indicated by the document-select input in the selected procurement document format indicated by the document-format input.

Often the contracting officer needs to send the same document, such as a bid package, in a variety of formats to a number of prospective bidders. The invention provides that the CGI listing script 100 provides e-mail lists 112' in a request form window 110'. The contracting officers inputs the user e-mail address list associated with the prospective bidders. Advantageously, the contracting officer need not indicate a selected document-format of the bidding package for each bidder as the e-mail list includes data in a record field indicating a procurement document format associated with the solicited user e-mail address. That is, the user e-mail address list comprises records, each record comprising a e-mail address field data and a selected document-format field data indicating the selected document format associated with the e-mail address field data of that record.

In a procurement embodiments the CGI listing script 100 and the CGI sending script 20 may comprise a single script.

Similar to the insurance agent embodiment, the procurement embodiment may utilize documents which include data field for the bidders to enter data. The completed documents, e.g., bid documents, can be sent by regular mail, by fax (although not generally considered secure) or by return e-mail. In procurement embodiments, the network server may include security precautions.

While preferred embodiments of the present invention have been described, it is to be understood that the invention is to be defined by the appended claims when read in light of the specification and accorded their full range of equivalence, with changes and modifications being apparent to those of skill in the art.

What is claimed is:

1. An internet-based automated document and data transfer system comprising:

an internet network server with a resident server gateway interface script configured to attach selected documents to an e-mail addressed to a designated e-mail address, the server gateway interface script and the documents residing in a CGI bin of the network server, the server gateway interface script being a CGI sending script instructing said network server to send the e-mail to a user e-mail address and to attach to the e-mail a user-selected document in a selected document format, wherein each of the documents is stored on the network server in plural word processing formats, plural spreadsheet formats, and plural databases formats respectively.

2. The internet-based automated document and data transfer system of claim 1, further comprising a CGI listing script, wherein said network server hosts plural documents and said CGI listing script;

said CGI listing script provides a user at a user terminal a list of available documents from the plural documents;

said CGI listing script provides the user a list of available document formats;

said CGI listing script solicits from the user the user e-mail address, a document-select input indicating the selected document to be transferred from the list of available documents, and a selected document-format input indicating the selected document format from the list of available document formats; and said CGI sending script instructs said network server to send the e-mail to the user e-mail address and to attach to the e-mail the selected document indicated by the document-select input in the selected format indicated by the document-format input.

3. The computer network document and data transfer system of claim 2, wherein said CGI listing script solicits the user e-mail address from browser cookies.

4. The computer network document and data transfer system of claim 3, wherein said CGI listing script solicits the user selected document format from browser cookies.

5. The computer network document and data transfer system of claim 1, wherein said CGI sending script residing on said network server instructs said network server to send an e-mail to each of a plurality of user e-mail addresses and to attach to each of the e-mails a selected document in a selected document format.

6. The computer network document and data transfer system of claim 5, further comprising:

an e-mail list residing on said network server, said e-mail list comprising addressee records, each said addressee record comprising an e-mail address entry and a selected format entry.

7. The computer network document and data transfer system of claim 1, further comprising:

a database related to said documents, the database being stored on said network server; and a CGI listing script hosted on said server, wherein, said CGI listing script provides an internet user at a user terminal a browser window listing available documents from the documents residing on the network server;

said CGI listing script provides the user a list of available document formats;

said CGI listing script solicits from the user the user e-mail address, a document-select input indicating the selected document to be transferred from the list of available documents, and a selected document-format input indicating the selected document format from the list of available document formats;

said CGI sending script solicits data from said database relating said selected document; and said CGI sending script instructs said network server to send the e-mail to the user e-mail address, to attach to the e-mail the selected document indicated by the document-select input in the selected format indicated by the document-format input, and to include in the e-mail the data solicited from said database.

8. An automated document transfer method enabling a user to remotely automatically select and locally receive a user-selected document in a user-selected document format from a network server, comprising the steps of:

hosting plural documents on a network server, each of the plural documents being stored on the network server in plural document formats; and a CGI sending script residing on the network server sending instructions to the network server to originate and send an e-mail to a user e-mail address and to attach to the e-mail a selected document, from the plural documents, in a selected document format, wherein the selected document format is at least one of a word processing format, a spreadsheet format, and a database format.

9. The method of claim 8, comprising the further steps of: providing a CGI listing script on the network server;

utilizing the CGI listing script to provide a user at a user terminal a list of available documents from the plural documents;

utilizing the CGI listing script to provide the user a list of available document formats;

utilizing the CGI listing script to solicit from the user the user e-mail address, a document-select input indicating the selected document to be transferred from the list of available documents, and a selected document-format input indicating the selected document format from the list of available document formats; and utilizing the CGI sending script to instruct the network server to send the e-mail to the user e-mail address and to attach to the e-mail the selected document indicated by the document-select input in the selected format indicated by the document-format input.

10. The method of claim 9, wherein the network server communicates with the user over the Internet.

11. The method of claim 9, wherein the network server communicates with the user over an Intranet.

12. The method of claim 11, wherein the network server communicates with other users over the Internet.

13. The method of claim 9, wherein said step of the CGI listing script soliciting the user e-mail address comprises the further step of soliciting the user e-mail address from the user's browser cookies.

14. The method of claim 13, wherein said step of the CGI listing script soliciting the user selected document format takes the user selected document format from the user's browser cookies.

15. The method of claim 14, wherein said step of utilizing the CGI listing script to provide the user a list of available document formats, shows as the selected document format, the user selected document format solicited from the user's browser cookies.

16. The method of claim 14, wherein said step of utilizing the CGI listing script to provide the user a list of available document formats, lists the user selected document format solicited from the user's browser cookies prior to other possible document formats.

17. The method of claim 8, further comprising the steps of:

hosting plural documents and a database related to the plural documents on the network server;

hosting a CGI listing script on the network server;

utilizing the CGI listing script to provide a user a list of available documents from the plural documents residing on the network server;

utilizing the CGI listing script to provide the user a list of available document formats;

soliciting from the user, with the CGI listing script, the user e-mail address, a document-select input indicating the selected document to be transferred from the list of available documents, and a selected document-format input indicating the selected document format from the list of available document formats;

utilizing the CGI sending script to read data from the database relating the selected document;

from the CGI sending script instructing the network server to send the e-mail to the user e-mail address, to attach to the e-mail the selected document indicated by the document-select input in the selected format indicated by the document-format input, and to include in the e-mail the data solicited from the database.

18. The automated document transfer method of claim 8, comprising the further steps of:

the network server communicating with the user over the Internet;

hosting data on the network server, the plural documents including plural procurement documents;

providing a CGI listing script on the network server;

utilizing the CGI listing script to provide the user at a user terminal a list of available procurement documents from the plural procurement documents;

utilizing the CGI listing script to solicit a user e-mail address, a document-select input indicating the selected procurement document to be transferred from the list of available procurement documents, and a selected document-format input indicating a procurement document format from the list of available procurement document formats associated with the solicited user e-mail address; and using the solicited user e-mail address, document-select input, and selected document-format input by the CGI sending script to instruct the network server to send the e-mail to the user e-mail address and to attach to the e-mail the selected procurement document indicated by the document-select input in the selected procurement document format indicated by the document-format input.

19. The method of claim 18, wherein said steps of utilizing the CGI listing script to solicit a user e-mail address and a selected document-format input indicating a procurement document format associated with the solicited user e-mail address is accomplished by utilizing the CGI listing script to provide the user a list of available e-mail address lists, each of which e-mail address lists including plural records comprising a user e-mail address field data and a selected document-format field data indicating the selected document format associated with the e-mail address field data of that record, and wherein the selected procurement document includes data fields for bidders to enter data.

20. An internet-based automated document and data transfer system comprising:

an internet network server hosting plural selectable documents, the selectable documents being selectable from an internet browser screen offering plural documents to a remote internet user;

a resident server gateway interface script configured to originate an e-mail and to attach a user-selected document to the e-mail, the resident server gateway interface script including a CGI sending script residing on said network server, said CGI sending script instructing said network server to originate and send the e-mail to a user e-mail address and to attach to the e-mail the selected document in a user-selected document format, wherein the selectable documents include data fields, each of the selectable documents being stored on the network server in plural document formats; and a CGI data extracting script which extracts user-entered data entered into data fields of a selected document returned from the user e-mail address and updates the database file with the extracted data by opening and amending the database file.

* * * * *